(12) United States Patent
Takeda et al.

(10) Patent No.: US 11,768,087 B2
(45) Date of Patent: Sep. 26, 2023

(54) DETECTION DEVICE, ROTARY MACHINE, AND DETECTION METHOD

(71) Applicant: MITSUBISHI HEAVY INDUSTRIES, LTD., Tokyo (JP)

(72) Inventors: Hiroki Takeda, Tokyo (JP); Kazuhiro Tamura, Tokyo (JP); Keiichiro Miyajima, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 3 days.

(21) Appl. No.: 17/630,609

(22) PCT Filed: Sep. 30, 2020

(86) PCT No.: PCT/JP2020/037088
§ 371 (c)(1),
(2) Date: Jan. 27, 2022

(87) PCT Pub. No.: WO2021/085015
PCT Pub. Date: May 6, 2021

(65) Prior Publication Data
US 2022/0252429 A1    Aug. 11, 2022

(30) Foreign Application Priority Data
Oct. 28, 2019   (JP) ................. 2019-195028

(51) Int. Cl.
*G01D 5/20*     (2006.01)
*G01P 3/481*    (2006.01)

(52) U.S. Cl.
CPC .............. *G01D 5/20* (2013.01); *G01P 3/481* (2013.01)

(58) Field of Classification Search
CPC . G01D 5/20; G01P 3/481; F01D 25/00; F01D 21/003; G01H 17/00; G01H 1/006; G01H 1/14
See application file for complete search history.

(56) References Cited

U.S. PATENT DOCUMENTS 4,482,859 A    11/1984  Fournier
4,967,153 A *  10/1990  Langley ................. G01P 3/488
                                                    73/660

(Continued)

FOREIGN PATENT DOCUMENTS

DE    10 2010 003 347    11/2010
JP          57-194309    11/1982
(Continued)

OTHER PUBLICATIONS

International Search Report dated Nov. 24, 2020 in International Application No. PCT/JP2020/037088.
(Continued)

*Primary Examiner* — Akm Zakaria
(74) *Attorney, Agent, or Firm* — Wenderoth, Lind & Ponack, L.L.P.

(57) ABSTRACT

A detection device is for detecting a passage timing of a turbine blade. This detection device is provided with: a sensor including a magnet and a coil that is disposed at a position subject to magnetic flux generated by the magnet and is configured to detect an induced electromotive force based on a change in the magnetic flux accompanying passage of the turbine blade; and an analyzer configured to detect the passage timing of the turbine blade, on the basis of an integrated signal obtained by integrating a signal based on the induced electromotive force.

9 Claims, 12 Drawing Sheets

(56) References Cited

U.S. PATENT DOCUMENTS

| | | | |
|---|---|---|---|
| 8,504,321 | B2 | 8/2013 | Seidel et al. |
| 2014/0035561 | A1 | 2/2014 | Pigott et al. |
| 2015/0260548 | A1 | 9/2015 | Pigott et al. |
| 2017/0045547 | A1* | 2/2017 | Sullivan ................. G01M 15/14 |
| 2017/0074102 | A1* | 3/2017 | Plante ..................... F01D 5/284 |
| 2021/0131861 | A1 | 5/2021 | Yamashita et al. |

FOREIGN PATENT DOCUMENTS

| | | |
|---|---|---|
| JP | 8-82547 | 3/1996 |
| JP | 2926140 | 7/1999 |
| JP | 2014-32196 | 2/2014 |
| WO | 2015/162414 | 10/2015 |
| WO | 2018/221577 | 12/2018 |

OTHER PUBLICATIONS

International Preliminary Report on Patentability (Chapter II) dated May 12, 2022 in International Application No. PCT/JP2020/037088, with English language translation.

Masataka Mase et al., "Rotational vibration measurement technique of recent steam turbine blades", Mitsubishi Heavy Industries, Ltd., Apr. 2000, Turbomachinery, vol. 28, No. 4, pp. 230-236, Cited in Specification.

Masataka Mase et al., "Latest progress and view for noncontact measurement technology of steam turbine blade vibration", May 1995, Turbomachinery, vol. 23, No. 5, pp. 282-288, Cited in Specification.

Yasutomo Kaneko, "Non-contact blade vibration measurement technique", Takasago Technical Institute, Mitsubishi Heavy Industries, Ltd., Sep. 18-Sep. 19, 2003, Japan Society of Mechanical Engineers Kansai Branch, 264th Workshop on Fundamentals and Applications of Stress Measurement, teaching material, VJ03-10, Cited in Specification.

* cited by examiner

FIG. 2
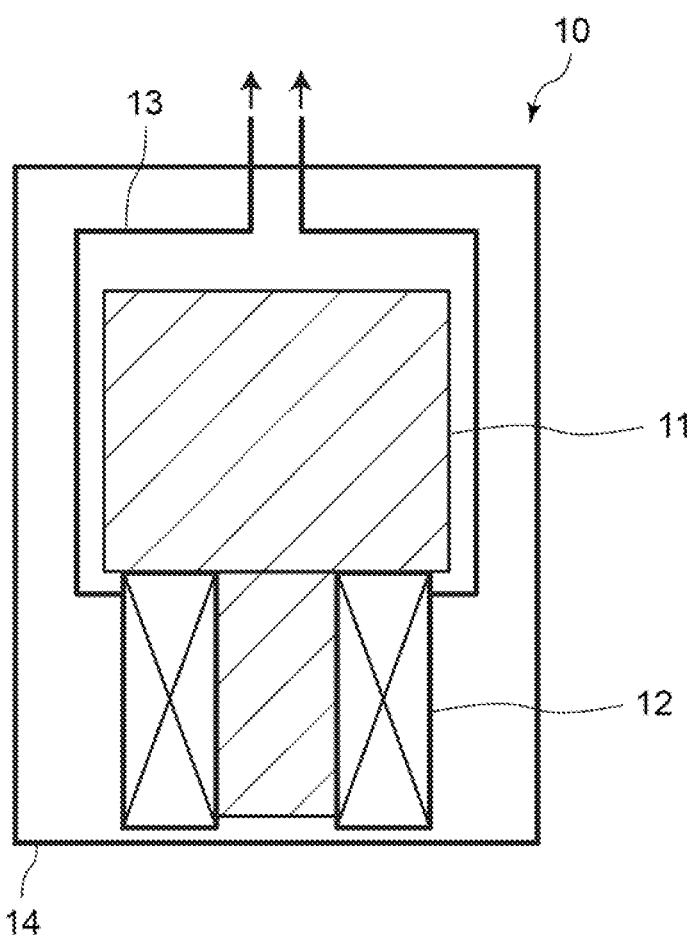
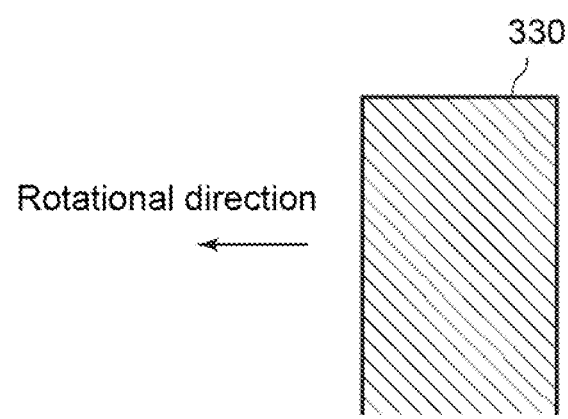
Rotational direction

DETECTION DEVICE, ROTARY MACHINE, AND DETECTION METHOD

TECHNICAL FIELD

The present disclosure relates to a detection device, a rotary machine, and a detection method.

BACKGROUND

As a method to measure the vibration of a turbine blade, detecting the timing of passage of the turbine blade in a non-contact manner has been proposed. For example, Non-Patent Literatures 1 to 3 disclose a detection device equipped with a magnet and a coil disposed at a position subject to the magnetic flux generated by the magnet. According to this detection device, the coil detects an induced electromotive force based on a change in the magnetic flux accompanying the passage of the turbine blade, and generates a pulse signal by contrasting a signal based on the induced electromotive force with a certain threshold to detect a passage timing of the turbine blade.

CITATION LIST

Non-Patent Literature

[Non-Patent Literature 1] Mitsubishi Heavy Industries, Ltd., Masataka Mase, Yasutomo Kaneko, "Rotational vibration measurement technique of recent steam turbine blades", April 2000, Turbomachinery, vol. 28(4), pp. 230-236

[Non-Patent Literature 2] Masataka Mase, Masaaki Shibata, "Latest progress and view for non-contact measurement technology of steam turbine blade vibration", May 1995, Turbomachinery, vol. 23(5), pp. 282-288

[Non-Patent Literature 3] Takasago Technical Institute, Mitsubishi Heavy Industries, Ltd., Yasutomo Kaneko, "Non-contact blade vibration measurement technique", Sep. 18-Sep. 19, 2003, Japan Society of Mechanical Engineers Kansai Branch, 264th Workshop on Fundamentals and Applications of Stress Measurement, teaching material (2003 Sep. 18, 19), VJ03-10

SUMMARY

Problems to be Solved

In the detection device disclosed in the Non-Patent Literatures 1 to 3, the waveform of the induced electromotive force is affected by a temporal change in the magnetic flux (time derivative term of the magnetic flux). Therefore, the waveform of the induced electromotive force changes depending on the rotation speed of the turbine blade.

As a result, while the rotation speed of the turbine blade is changing, the detection timing based on the comparison with a certain threshold fluctuates. In other words, the positional relationship between the turbine blade and the detection device at a detection timing, at which the turbine blade is determined to have passed, changes with each detection. As a result, the accuracy of detecting a passage timing of the turbine blade may be degraded. Further, when the rotation speed of the turbine blade is low, the signal based on the induced electromotive force may not reach the threshold due to a decrease in the peak value of the induced electromotive force waveform (decrease in amplitude at the time of passage), and the passage of the turbine blade may not be detected.

In view of the above, an object of the present disclosure is to improve the accuracy of detection of a passage timing of a turbine blade.

Solution to the Problems

A detection device according to the present disclosure is for detecting a passage timing of a turbine blade and includes: a sensor including a magnet and a coil that is disposed at a position subject to magnetic flux generated by the magnet and is configured to detect an induced electromotive force based on a change in the magnetic flux accompanying passage of the turbine blade; and an analyzer configured to detect the passage timing of the turbine blade, on the basis of an integrated signal obtained by integrating a signal based on the induced electromotive force.

A rotary machine according to the present disclosure includes a turbine blade and the above-described detection device.

A detection method according to the present disclosure is for detecting a passage timing of a turbine blade and includes: a step of detecting, by a sensor including a magnet and a coil disposed at a position subject to magnetic flux generated by the magnet, an induced electromotive force based on a change in the magnetic flux accompanying passage of the turbine blade; and a step of detecting the passage timing of the turbine blade, on the basis of an integrated signal obtained by integrating a signal based on the induced electromotive force, by an analyzer.

Advantageous Effects

According to the present disclosure, it is possible to improve the accuracy of detection of the passage timing of a turbine blade.

BRIEF DESCRIPTION OF DRAWINGS

FIG. 2 is a schematic diagram showing a configuration of a sensor of a detection device according to an embodiment.

DETAILED DESCRIPTION

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Configuration of Rotary Machine According to Embodiment)

Figure 1:
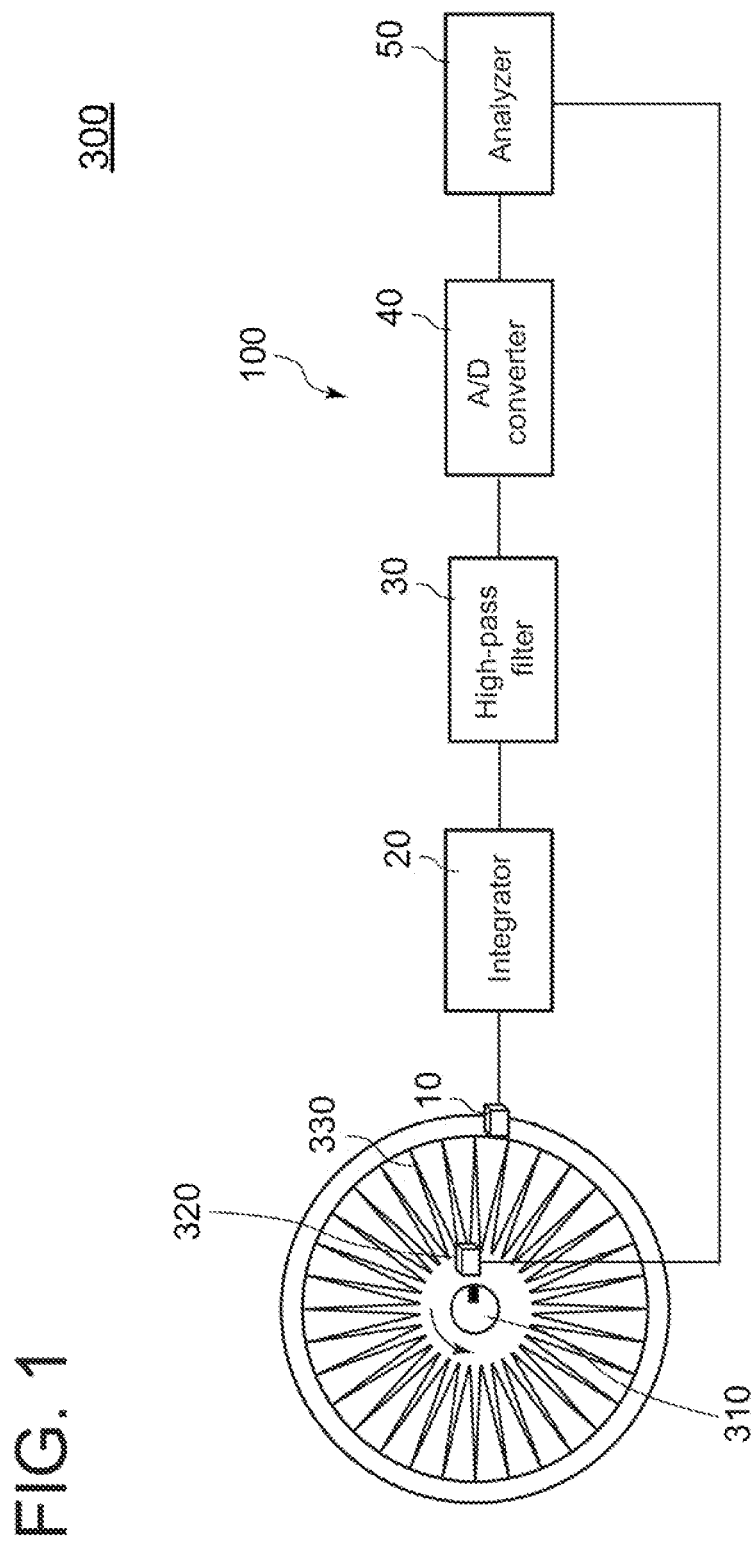
FIG. 1 is a schematic diagram for describing a configuration of a rotary machine equipped with a detection device according to an embodiment.

A configuration of a rotary machine 300 according to an embodiment of the present disclosure will be described with reference to FIG. 1. FIG. 1 is a schematic diagram for describing a configuration of the rotary machine 300 equipped with a detection device 100 according to an embodiment.

The rotary machine 300 may be, for example, a gas turbine, a steam turbine, or a compressor. As shown in FIG. 1, the rotary machine 300 includes a rotational shaft 310, a rotation speed detection sensor 320 configured to detect the rotation speed, and one or more turbine blades 330 rotating around the rotational shaft 310.

The turbine blade 330 is a magnetic material. The rotation speed detection sensor 320 generates a signal indicating the rotation speed of the turbine blade 330 (e.g., a pulse signal that outputs one pulse for each rotation) and outputs the signal indicating the rotation speed to the detection device 100. The detection device 100 is configured to identify, on the basis of this signal, what number of the turbine blade 330 that has passed.

The rotary machine 300 further includes a detection device 100 for detecting the passage timing of the turbine blade 330. The detection device 100 is equipped with a sensor 10, an integrator 20, a high-pass filter 30, an A/D converter 40, and an analyzer 50. A dedicated amplifier (not shown) that can adjust the magnitude of the output of the sensor 10 may be provided between the sensor 10 and the integrator 20.

The sensor 10 is configured to detect an induced electromotive force produced by electromagnetic induction action. The sensor 10 is fixed to be stationary while the turbine blade 330 is rotatable. FIG. 2 is a schematic diagram showing a configuration of the sensor 10 of the detection device 100 according to an embodiment. This figure shows a cross-sectional view of the sensor 10, taken along a plane parallel to the rotational direction of the turbine blade 330.

As shown in FIG. 2, for example, the sensor 10 includes a magnet 11 for generating magnetic flux, a coil 12 disposed at a position subject to the magnetic flux from the magnet 11, a conducting wire 13 connected at one end to the coil 12, and a housing 14. The configuration of the sensor 10 is not limited to the example shown in FIG. 2.

The coil 12 is disposed between the magnet 11 and the turbine blade 330, for example. The coil 12 is configured to detect an induced electromotive force based on a change in the magnetic flux (magnetic flux distribution) accompanying the passage of the turbine blade 330 moving in the rotational direction. The other end of the conducting wire 13 is connected to the dedicated amplifier or the integrator 20, which will be described later.

The sensor 10 is, for example, fixed to a casing (not shown) that accommodates the turbine blade 330 so as to have sensitivity in the direction of the tip of the turbine blade 330. The detection device 100 may be configured with a single sensor 10. Alternatively, the detection device 100 may be configured with a plurality of sensors 10 arranged in circumferential positions opposite the turbine blade 330.

In some embodiments, for example as shown in FIGS. 1 to 2, the integrator 20 is disposed between the coil 12 of the sensor 10 and the analyzer 50. The integrator 20 is configured to integrate the signal based on the induced electromotive force from the coil 12 and output the integrated signal.

The signal based on the induced electromotive force is a signal including a time derivative term when shown in a mathematical expression. The signal based on the induced electromotive force is, for example, a signal indicating a voltage value (induced electromotive force) induced in the coil 12 by electromagnetic induction. For example, the voltage V (V), which is the induced electromotive force, is expressed by the expression: $V=-Nd\varphi/dt$. N is the number of turns of the coil 12, and $\varphi$ is the magnetic flux (Wb). However, the signal based on the inductive electromotive force is not limited thereto. For example, the signal based on the induced electromotive force may be an electrical signal converted by a method other than integration of the voltage induced in the coil 12, or may be numerical data processed by a method other than integration of the induced electromotive force.

In some embodiments, the integrator 20 includes, for example, an integration circuit and is configured to integrate the voltage signal which is the induced electromotive force of the coil 12. In this case, the voltage V (V) indicating the integrated signal is expressed by $V=-N\varphi+C$. C is an integration constant. The integrated signal may not be a signal generated by the integrator 20 but a result of integrating the signal based on the induced electromotive force by calculation process of the analyzer 50. In other words, the integrator 20 may be eliminated from the detection device 100.

In some embodiments, for example as shown in FIG. 1, the high-pass filter 30 is disposed on the output side of the integrator 20. The high-pass filter 30 is configured to allow only a high frequency component of the integrated signal to pass. Instead of the high-pass filter 30, a digital filter (not shown) may be disposed on the output side of the A/D converter 40 to remove low-frequency noise, or low-frequency noise may be removed by signal processing of the analyzer 50. In other words, the high-pass filter 30 may be eliminated from the detection device 100.

In some embodiments, for example as shown in FIG. 1, the A/D converter 40 is disposed on the input side of the analyzer 50. The A/D converter 40 is configured to convert an input analog signal into a digital signal and output the digital signal. This facilitates signal analysis by the analyzer 50.

The analyzer 50 is configured to detect the passage timing of the turbine blade 330 on the basis of the integrated signal obtained by integrating the signal based on the induced electromotive force. In some embodiments, for example as shown in FIG. 1, the analyzer 50 detects the passage timing of the turbine blade 330 on the basis of the integrated signal that has passed through the high-pass filter 30.

The analyzer 50 obtains the passage timing of the turbine blade 330 by comparing the integrated signal with a certain threshold. For example, the analyzer 50 detects the timing at which the integrated signal exceeds the threshold as the passage timing of the turbine blade 330. The analyzer 50 may be configured to detect the timing at which the signal falls below the threshold as the passage timing of the turbine blade 330, or may be configured to detect the passage timing of the turbine blade 330 on the basis of both the timing at which the signal exceeds the threshold and the timing at which the signal falls below the threshold.

The analyzer 50 may be configured to further analyze the vibration state of the turbine blade 330 on the basis of the detected passage timing. Further, the analyzer 50 may be configured to output information indicating the detected passage timing to another device.

(Configuration of Rotary Machine According to Comparative Example)

Figure 3:
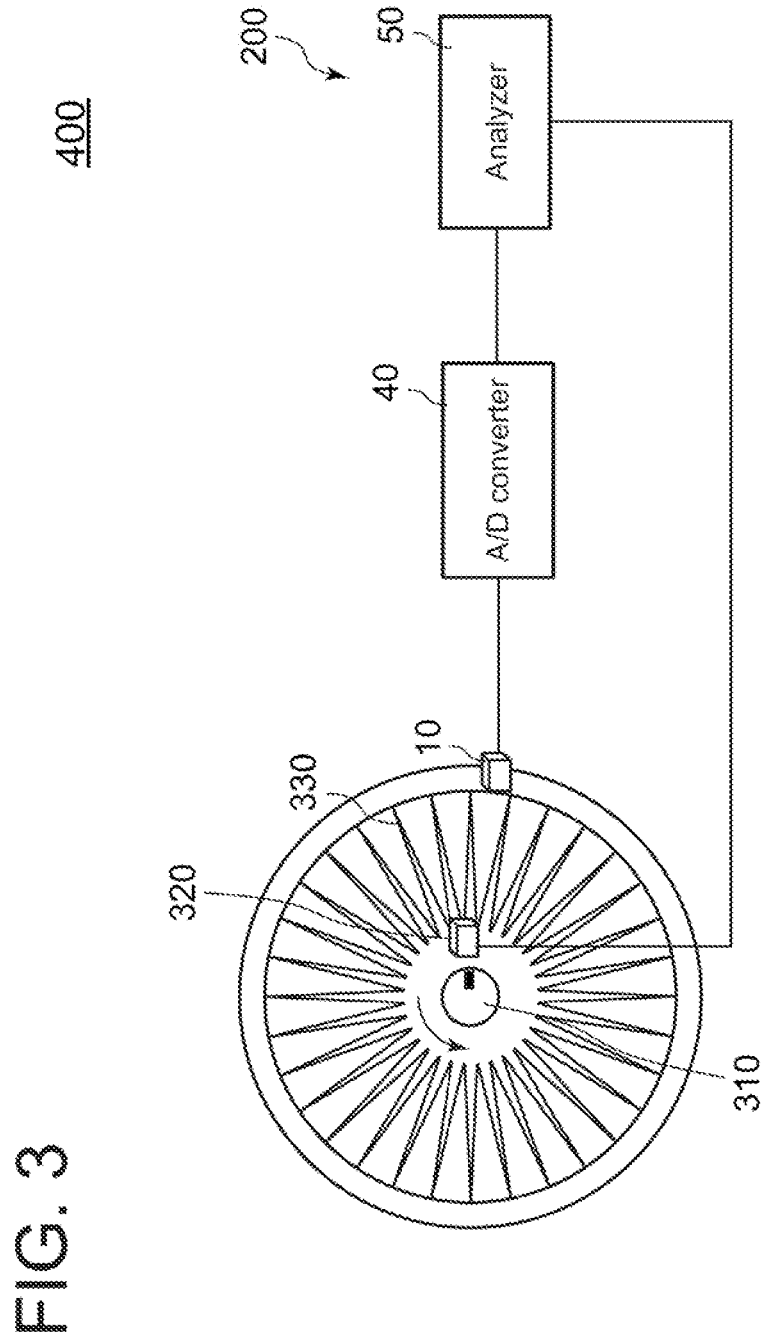
FIG. 3 is a schematic diagram for describing a configuration of a rotary machine equipped with a detection device according to a comparative example.

A rotary machine 400 according to a comparative example will now be described. FIG. 3 is a schematic diagram for describing a configuration of the rotary machine 400 equipped with a detection device 200 according to a comparative example.

As shown in FIG. 3, the rotary machine 400 according to the comparative example includes a rotational shaft 310, a rotation speed detection sensor 320 configured to detect the rotation speed, one or more turbine blades 330 rotating around the rotational shaft 310, and a detection device 200. The detection device 200 is equipped with a sensor 10, an A/D converter 40, and an analyzer 50.

Thus, the configuration of the rotary machine 400 according to the comparative example differs from that of the rotary machine 300 according to the embodiment in that it is not equipped with the integrator 20 and the high-pass filter 30. The rest of the configuration is basically the same.

(Detection Principle of Detection Device According to Comparative Example)

Figure 4:
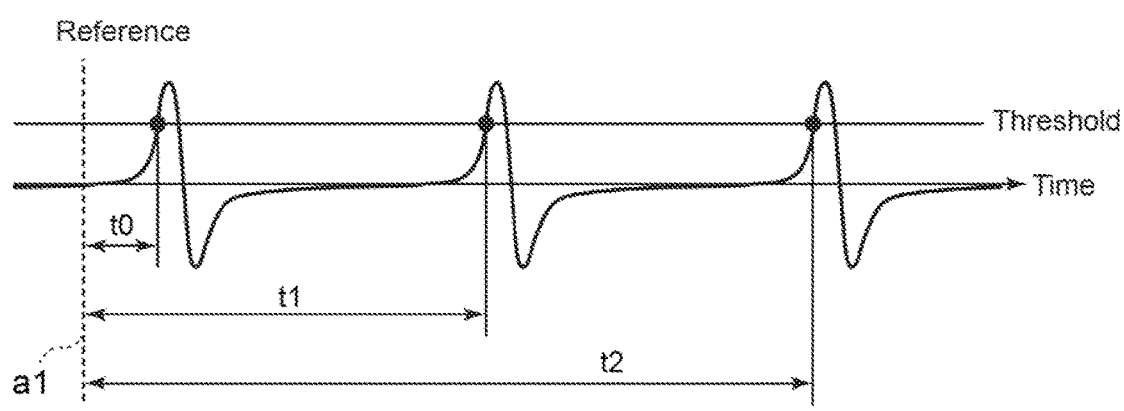
FIG. 4 is a waveform diagram showing a signal based on the induced electromotive force according to a comparative example.

The detection device 200 of the rotary machine 400 according to the comparative example analyzes a signal based on the induced electromotive force (the waveform after A/D conversion of the waveform of the induced electromotive force) to detect the passage timing of the turbine blade 330. FIG. 4 is a waveform diagram showing a signal based on the induced electromotive force according to the comparative example.

In the example shown in FIG. 4, the signal based on the induced electromotive force oscillates up and down each time the turbine blade 330 passes. FIG. 4 shows the temporal change of the signal based on the induced electromotive force when three turbine blades 330 have passed. The horizontal axis represents the time, and the vertical axis represents the signal strength (e.g., voltage value of induced electromotive force).

When such a waveform is obtained, a reference timing is set at an arbitrary position, and a certain threshold (a trigger voltage value when the waveform is a voltage waveform) is set. For example, the timing at which the signal strength exceeds the threshold is detected as the passage timing of the turbine blade 330. Thus, the threshold is set so that one passage timing is detected each time the turbine blade 330 passes.

The passage timing is detected as a time difference from the reference timing shown by the dotted line a1. For example, in the example shown in FIG. 4, the passage timing is detected as t0 for the passage of the first turbine blade 330, t0 for the passage of the second turbine blade 330, and t2 for the passage of the third turbine blade 330. When the rotary machine 400 has forty turbine blades 330, for example, the passage timings t0 to t39 are detected.

When detecting the vibration of the turbine blade 330 on the basis of such passage timing, the passage timings of the same turbine blade 330 are compared with each other. For example, by comparing t1 in the third rotation with t1 in the fourth rotation, a difference in the passage timing is detected, and the vibration state of the turbine blade 330 is checked based on this difference. The difference may be detected every rotation or every few rotations. The detection of vibration may be performed by the analyzer 50.

The waveform of the signal based on the induced electromotive force varies depending on the shape of the turbine blade 330. Therefore, depending on the shape of the turbine blade 330, the detection principle of the detection device 200 according to the comparative example may not be able to accurately detect the passage timing of the turbine blade 330. Then, three shapes of the turbine blades 330 will be illustrated, and the waveforms of signals based on the induced electromotive force when those turbine blades 330 have passed will be described.

Figure 5A:
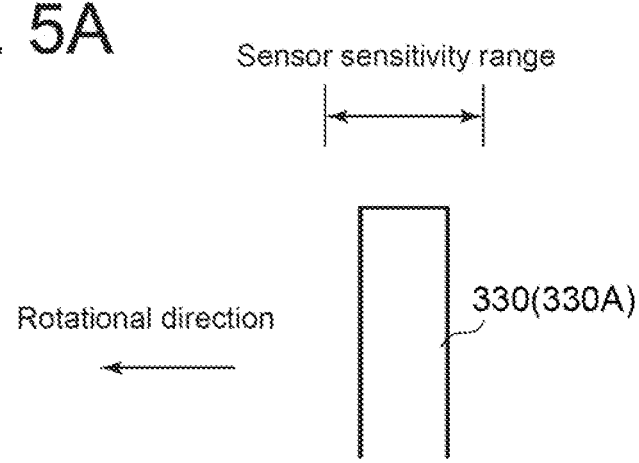
FIG. 5A is a schematic diagram showing an example of a relationship between the shape of the turbine blade and the sensor sensitivity range.
Figure 5B:
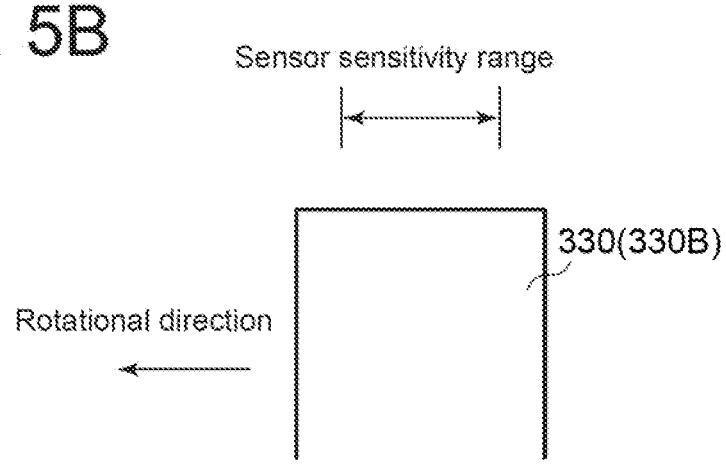
FIG. 5B is a schematic diagram showing an example of a relationship between the shape of the turbine blade and the sensor sensitivity range.
Figure 5C:
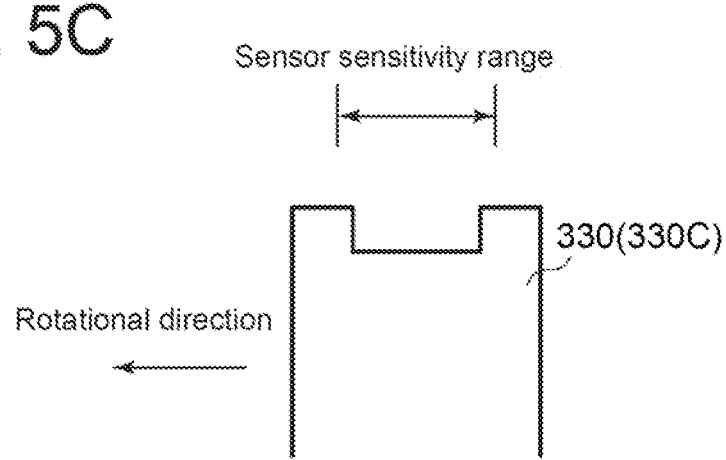
FIG. 5C is a schematic diagram showing an example of a relationship between the shape of the turbine blade and the sensor sensitivity range.

FIG. 5A is a schematic diagram showing an example of a relationship between the shape of the turbine blade 330 (330A) and the sensor sensitivity range. FIG. 5B is a schematic diagram showing an example of a relationship between the shape of the turbine blade 330 (330B) and the sensor sensitivity range. FIG. 5C is a schematic diagram showing an example of a relationship between the shape of the turbine blade 330 (330C) and the sensor sensitivity range. These turbine blades 330 (330A, 330B, 330C) are single blades where adjacent blades are not connected to each other. The sensor sensitivity range shown in FIGS. 5A to 5C indicates the width of the region where the turbine blade 330 can affect the induced electromotive force of the sensor 10.

Figure 6A:
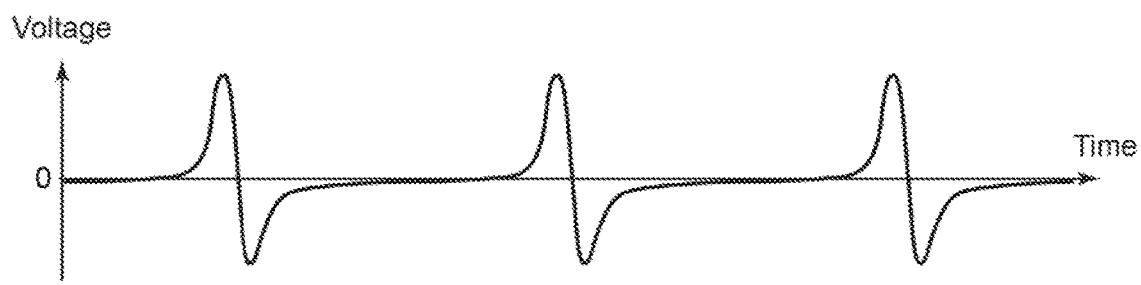
FIG. 6A is a waveform diagram showing a signal based on the induced electromotive force corresponding to FIG. 5A.
Figure 6B:
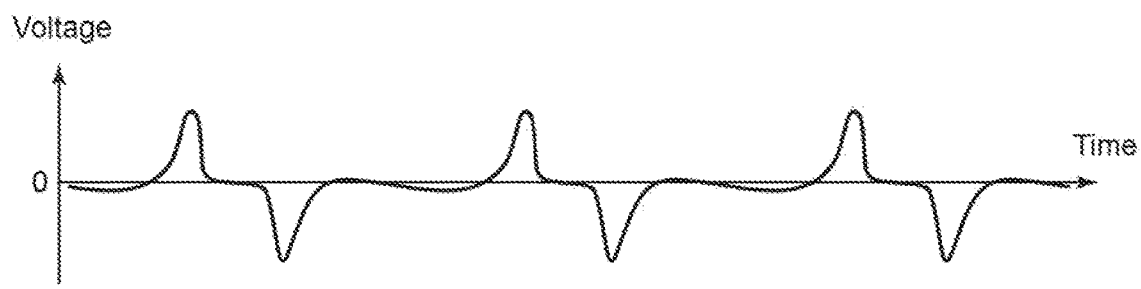
FIG. 6B is a waveform diagram showing a signal based on the induced electromotive force corresponding to FIG. 5B.
Figure 6C:
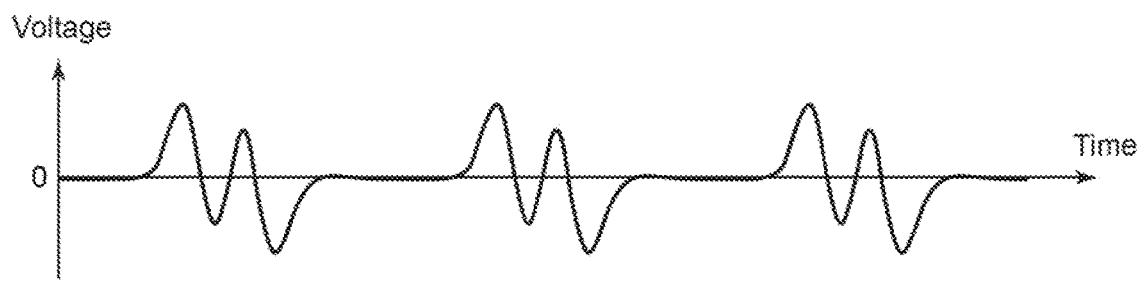
FIG. 6C is a waveform diagram showing a signal based on the induced electromotive force corresponding to FIG. 5C.

FIG. 6A is a waveform diagram showing a signal based on the induced electromotive force corresponding to FIG. 5A. FIG. 6B is a waveform diagram showing a signal based on the induced electromotive force corresponding to FIG. 5B. FIG. 6C is a waveform diagram showing a signal based on the induced electromotive force corresponding to FIG. 5C. Each waveform diagram shows the waveform based on the induced electromotive force when three turbine blades 330 have passed. The horizontal axis represents the time, and the vertical axis represents the voltage value.

As shown in FIG. 5A, when the width of turbine blade 330 (330A) is smaller than the sensitivity range of the sensor 10, and the tip (radially outer end surface) of the turbine blade 330 (330A) is flat, the waveform indicating the signal based on the induced electromotive force shown in FIG. 6A is obtained. In this case, it is conceivable to set a threshold as shown in FIG. 4 to detect the passage timing of the turbine blade 330.

However, the amplitude of the signal based on the induced electromotive force decreases as the rotation speed decreases. In other words, the change (peak value) in the signal strength accompanying the passage of the turbine blade 330 (330A) decreases. In this case, even if the strength of the signal based on the induced electromotive force is at a peak value, it is possible that the signal strength does not reach the threshold, and the passage timing of the turbine blade 330 (330A) cannot be detected.

As shown in FIG. 5B, when the width of turbine blade 330 (330B) is larger than the sensitivity range of the sensor 10, and the tip of the turbine blade 330 (330B) is flat, the waveform indicating the signal based on the induced electromotive force shown in FIG. 6B is obtained. In this case, it is conceivable to set a threshold as shown in FIG. 4 to detect the passage timing of the turbine blade 330. In this case, similarly, since the change (peak value) in the signal strength decreases as the rotation speed decreases, it is possible that the passage timing of the turbine blade 330 (330B) cannot be detected.

As shown in FIG. 5C, when the width of turbine blade 330 (330C) is larger than the sensitivity range of the sensor 10, and the tip (radially outer end surface) of the turbine blade 330 (330C) has an uneven shape, the waveform indicating the signal based on the induced electromotive force shown in FIG. 6C is obtained. The induced electromotive force detected based on the passage of the turbine blade 330 (330C) is likely to have multiple peak voltages passing through 0V for the passage of one turbine blade 330 (330C).

In this case, the waveform of the signal based on the induced electromotive force is not suitable for detecting the passage timing of the turbine blade 330 (330C), and it may be difficult to accurately detect the passage timing of the turbine blade 330 (330C). For example, there is a possibility that the passage of one turbine blade 330 (330C) and the detection timing do not correspond one-to-one. Further, since the change (peak value) in the signal strength decreases as the rotation speed decreases, it is possible that the passage timing of the turbine blade 330 (330C) cannot be detected.

Thus, the detection device 200 of the rotary machine 400 according to the comparative example may not be able to accurately detect the passage timing of the turbine blade 330. Therefore, the detection principle of the detection device 100 according to an embodiment will be described.

(Detection Principle of Detection Device According to Embodiment)

Figure 7:
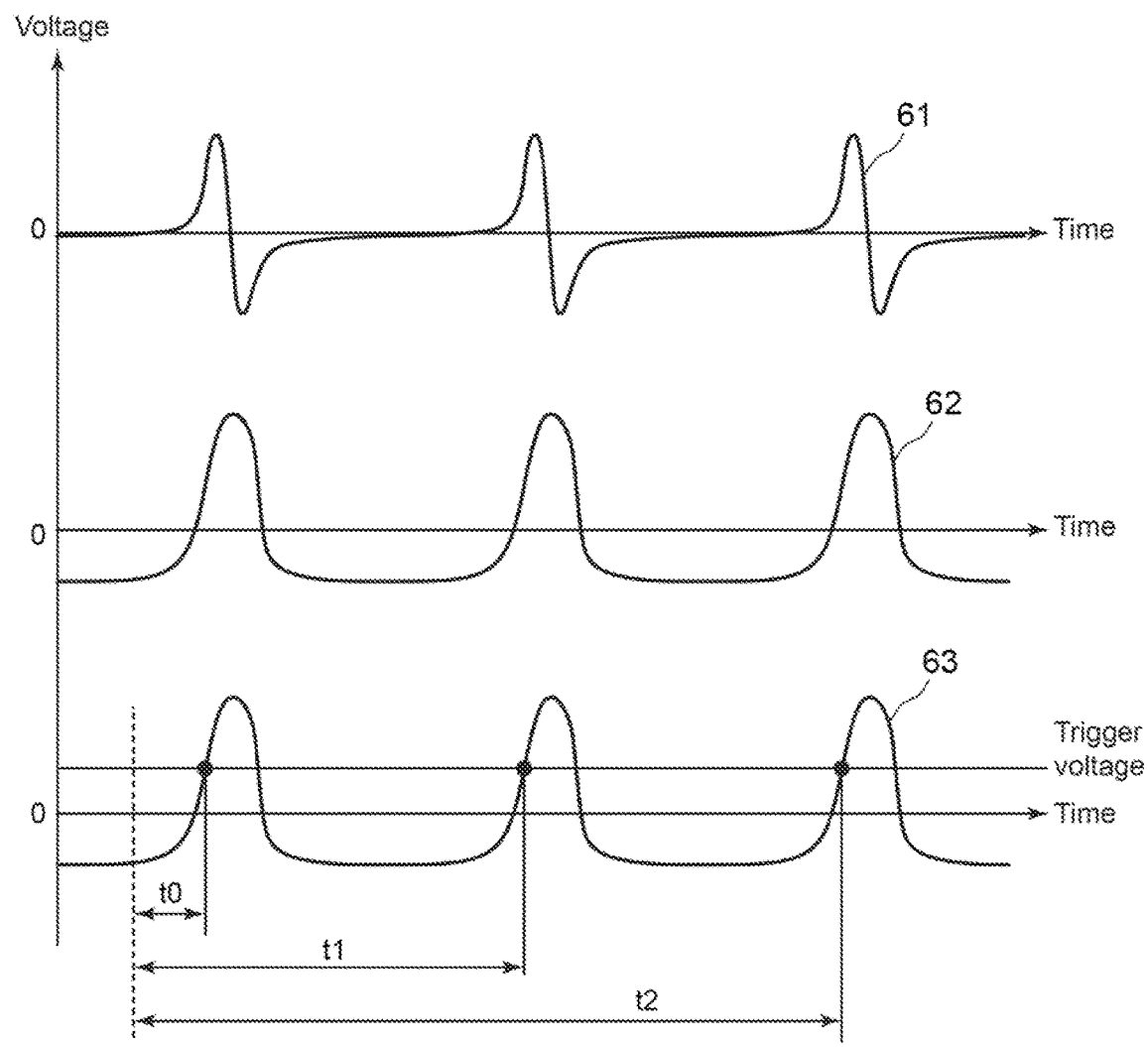
FIG. 7 is a waveform diagram for describing a relationship of various signals of the detection device according to an embodiment.

The detection device 100 of the rotary machine 300 according to an embodiment analyzes not the signal based on the induced electromotive force but an integrated signal obtained by integrating this signal (the waveform after A/D conversion of the waveform of the integrated signal) to detect the passage timing of the turbine blade 330. FIG. 7 is a waveform diagram for describing a relationship of various signals of the detection device 100 according to an embodiment.

This figure shows the temporal change of the signals when three turbine blades 330 have passed. The horizontal axis represents the time, and the vertical axis represents the signal strength (e.g., voltage value). Specifically, this figure shows in timing chart form a waveform 61 based on the induced electromotive force, which is the output signal of the sensor 10 shown in FIG. 1, a waveform 62 of the output signal of the high-pass filter 30 shown in FIG. 1 (the integrated signal after removing low-frequency noise), and a waveform 63 analyzed in the analyzer 50.

As shown in FIG. 7, in the waveform 61 indicating the signal based on the induced electromotive force, the signal strength oscillates up and down each time the turbine blade 330 passes. The waveform 61 is essentially the same as the waveform shown in FIG. 6A. The waveform 62 corresponds to the integral of the waveform 61. Therefore, in the waveform 62, the signal strength is at a peak value at the timing corresponding to the zero-crossing point of the vertical oscillation associated with the passage of the turbine blade 330 in the waveform 61. Further, the waveform 62 has a positive slope at the position where the waveform 61 takes a positive value and a negative slope at the position where the waveform 61 takes a negative value.

The waveform 63 is essentially the same as the waveform 62. The waveform 63 differs from the waveform 62 in that a threshold (trigger voltage) is set. The analyzer 50 of the detection device 100 detects the timing at which the voltage value exceeds the threshold in the waveform 63 as the passage timing of the turbine blade 330.

Thus, according to the detection device 100, the passage timing of the turbine blade 330 is detected on the basis of the integrated signal in which the effect of the time derivative term of the magnetic flux is reduced. The change in the waveform of the integrated signal is small even when the rotation speed of the turbine blade 330 changes. Further, the change in the peak value of the integrated signal due to the change in the rotation speed of the turbine blade 330 is small. Therefore, even during a change in the rotation speed, the positional relationship between the turbine blade 330 and the sensor 10 at the timing when the threshold is reached is the same. Thus, with the detection device 100, it is possible to improve the accuracy of detection of the passage timing of the turbine blade 330.

The waveform of the integrated signal varies depending on the shape of the turbine blade 330. Then, the waveforms of integrated signals for three shapes of the turbine blades 330 will be described.

Figure 8A:
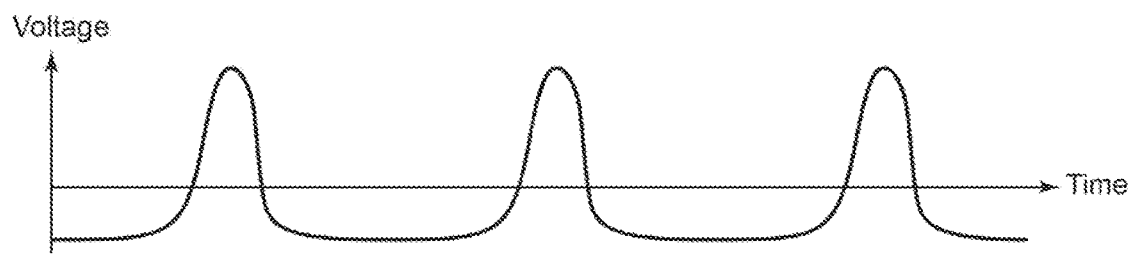
FIG. 8A is a waveform diagram showing an integrated signal corresponding to FIG. 5A.
Figure 8B:
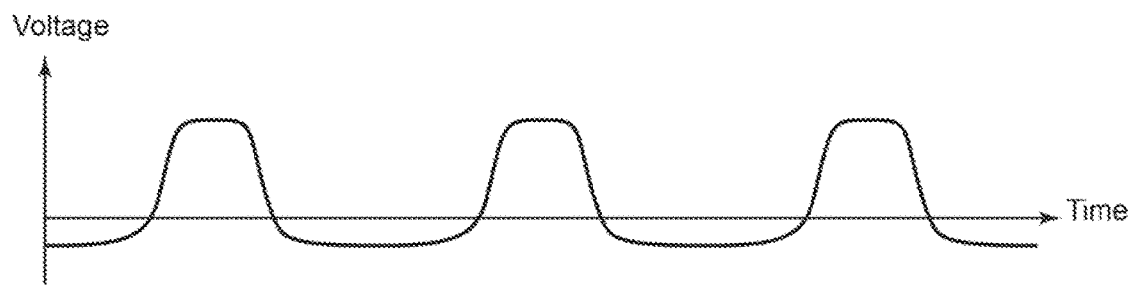
FIG. 8B is a waveform diagram showing an integrated signal corresponding to FIG. 5B.
Figure 8C:
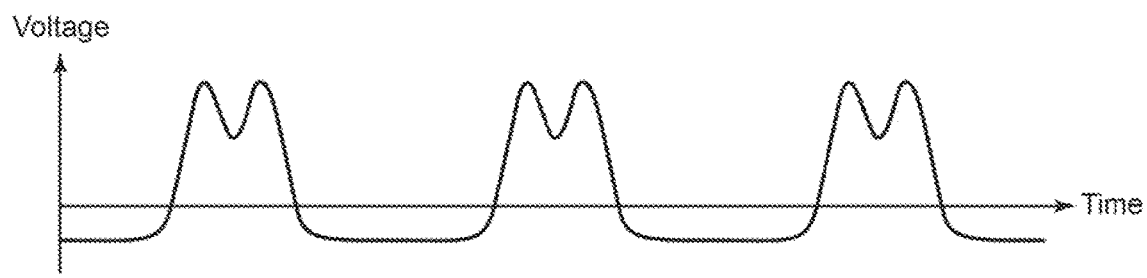
FIG. 8C is a waveform diagram showing an integrated signal corresponding to FIG. 5C.

FIG. 8A is a waveform diagram showing an integrated signal corresponding to FIG. 5A. FIG. 8B is a waveform diagram showing an integrated signal corresponding to FIG. 5B. FIG. 8C is a waveform diagram showing an integrated signal corresponding to FIG. 5C. Each waveform diagram shows the integrated signal when three turbine blades 330 have passed. The horizontal axis represents the time, and the vertical axis represents the voltage value.

In the waveform shown in FIG. 8A, the passage timing of the turbine blade 330 can be detected as in the case shown in FIG. 7. The turbine blade 330 (330B) shown in FIG. 5B has a flat tip with a larger width than the sensitivity range of the sensor 10, compared to the turbine blade 330 (330A) shown in FIG. 5A. In this case, since the change in the magnetic flux when the flat tip of the turbine blade 330 (330B) passes through is small, the waveform shown in FIG. 8B has a gentle shape around the peak value compared to the waveform shown in FIG. 8A. In the waveform shown in FIG. 8B, the passage timing of the turbine blade 330 can be detected as in the waveform shown in FIG. 8A.

In the waveform shown in FIG. 8C, depression is formed in the fluctuating portion when one turbine blade 330 (330C) passes through, corresponding to the uneven shape of the tip end (outer peripheral surface) of the turbine blade 330 (330C). However, there is only one peak voltage passing through 0V. Further, the voltage value of the waveform when the recessed portion of the tip of the turbine blade 330 (330C) passes through the center position of the sensitivity range of the sensor 10 is larger than the voltage value of the waveform when the turbine blade 330 (330C) is out of the sensitivity range of the sensor 10.

Therefore, by setting a threshold lower than the voltage value of the waveform when the recessed portion of the tip of the turbine blade 330 (330C) passes through the center position of the sensitivity range of the sensor 10, it is possible to stably detect the passage timing. Thus, with the detection device 100, it is possible to accurately detect the passage timing of the turbine blade 330 (330A, 330B, 330C).

Figure 9:
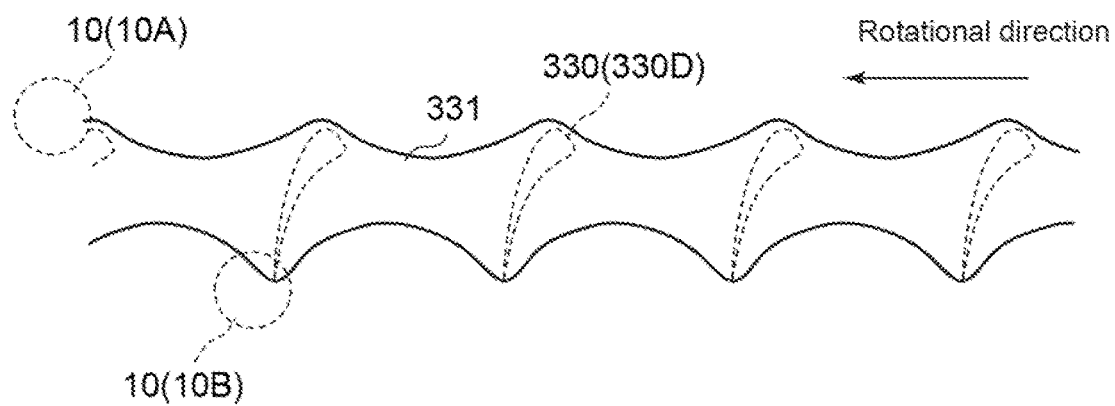
FIG. 9 is a schematic diagram showing an example of arrangement of the sensor when the turbine blade is a shrouded blade.

Hereinafter, the rotary machine 300 including the turbine blade 330 (330D) which is a shrouded blade will be described. FIG. 9 is a schematic diagram showing an example of arrangement of the sensor 10 when the turbine blade 330 (330D) is a shrouded blade. In the case of detecting the passage timing of the turbine blade 330 (330D) which is a shrouded blade, the sensor 10 is disposed near the axial end surface of the shroud portion 331 of the turbine blade 330 (330D), as shown in FIG. 9. The sensor 10 may be disposed on the leading edge side of the blade portion of the turbine blade 330 (330D) as shown by the sensor (10A) in FIG. 9, or may be disposed on the trailing edge side of the blade portion of the turbine blade 330 (330D) as shown by the sensor (10B) in FIG. 9. Whether the sensor 10 is disposed on the leading edge side or the trailing edge side of the blade portion of the turbine blade 330 (330D) may be determined, for example, by checking the way the blade vibrates (vibration mode shape) through analysis and selecting the one that is advantageous for measurement, such as having a large amplitude.

Figure 10:
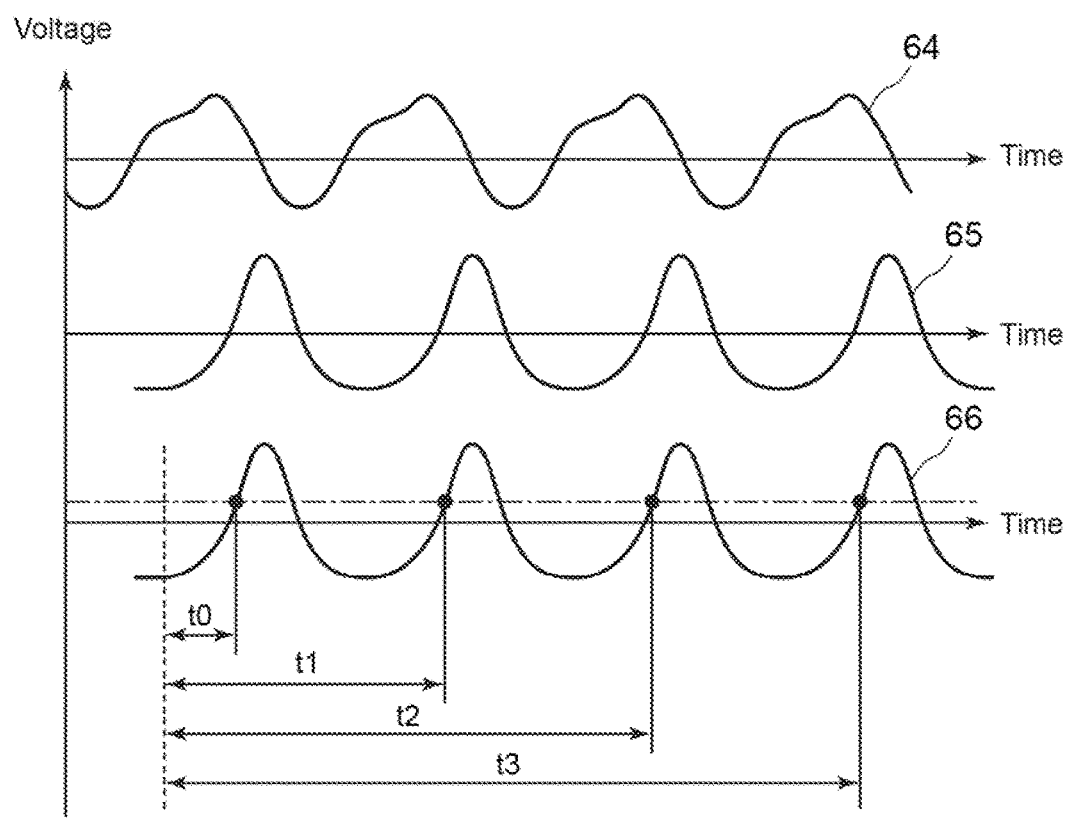
FIG. 10 is a waveform diagram for describing a relationship of various signals of the detection device according to an embodiment.

FIG. 10 is a waveform diagram for describing a relationship of various signals of the detection device 100 according to an embodiment. This figure shows the temporal change of the signals when three turbine blades 330 (330D) have passed. The horizontal axis represents the time, and the vertical axis represents the signal strength (e.g., voltage value). Specifically, this figure shows in timing chart form a waveform 64 based on the induced electromotive force, which is the output signal of the sensor 10 shown in FIG. 1, a waveform 65 of the output signal of the high-pass filter 30 shown in FIG. 1 (the integrated signal after removing low-frequency noise), and a waveform 66 analyzed in the analyzer 50.

In the turbine blade 330 (330D) which is a shrouded blade, there is no boundary between the presence and absence of the blade when viewed from the sensor 10, unlike the turbine blade 330 (330A, 330B, 330C) which is a single blade. Therefore, as shown in FIG. 10, in the waveform 64 based on the induced electromotive force, the signal strength oscillates up and down each time the turbine blade 330 (330D) passes. However, the waveform 64 is a gentle waveform with no flat areas, compared to the waveform shown in FIG. 6A.

When detecting the passage of the turbine blade 330 (330D) in the waveform 64 based on the induced electromotive force, the detection timing fluctuates greatly depending on the magnitude of a certain threshold (trigger voltage) to be set. Further, the amplitude (peak value) of the fluctuation at the time of passage is likely to fluctuate depending on the rotation speed. Therefore, if a certain threshold (trigger voltage) is not set in the vicinity of the peak value, the detection timing significantly varies with a change in the rotation speed. In other words, the positional relationship between the turbine blade 330 (330D) and the sensor 10 fluctuates with each detection.

If a certain threshold (trigger voltage) is set in the vicinity of the peak value, the variation of the detection timing with a change in the rotation speed is reduced. However, if a certain threshold (trigger voltage) is set in the vicinity the peak value, the turbine blade 330 (330D) may not be detected when the peak value decreases due to a change in the rotation speed.

Thus, it is difficult to appropriately set a threshold for the waveform 64 based on the induced electromotive force. Therefore, in a configuration where the passage of the turbine blade 330 (330D) is detected on the basis of the induced electromotive force as in the detection device 100 according to the comparative example, the detection accuracy may degrade.

In contrast, the waveform 65 corresponds to the integral of the waveform 64. Therefore, the waveform 64 takes a peak value at the timing corresponding to the zero-crossing point of the vertical oscillation associated with the passage of the turbine blade 330 (330D) in the waveform 63. Further, the waveform 65 has a positive slope at the position where the waveform 64 takes a positive value and a negative slope at the position where the waveform 64 takes a negative value.

The waveform 66 is essentially the same as the waveform 65. The waveform 66 differs from the waveform 65 in that a threshold (trigger voltage) is set. The analyzer 50 of the detection device 100 detects the timing at which the voltage value exceeds the threshold in the waveform 66 as the passage timing of the turbine blade 330 (330D).

In this case, the fluctuation of the detection timing depending on the magnitude of the set threshold (trigger voltage) is small. Further, the amplitude (peak value) of the fluctuation at the time of passage is unlikely to fluctuate depending on the rotation speed. In other words, the fluctuation of the positional relationship between the turbine blade 330 (330D) and the sensor 10 fluctuates with each detection is reduced. Therefore, it is possible to set a certain threshold (trigger voltage) outside the vicinity of the peak value. Further, since the setting range of the threshold is not limited to the vicinity of the peak value, the passage of the turbine blade 330 (330D) can be detected even if the peak value decreases due to a change in the rotation speed. Thus, with the detection device 100, it is possible to accurately detect the passage timing of the turbine blade 330 (330D).

Figure 11:
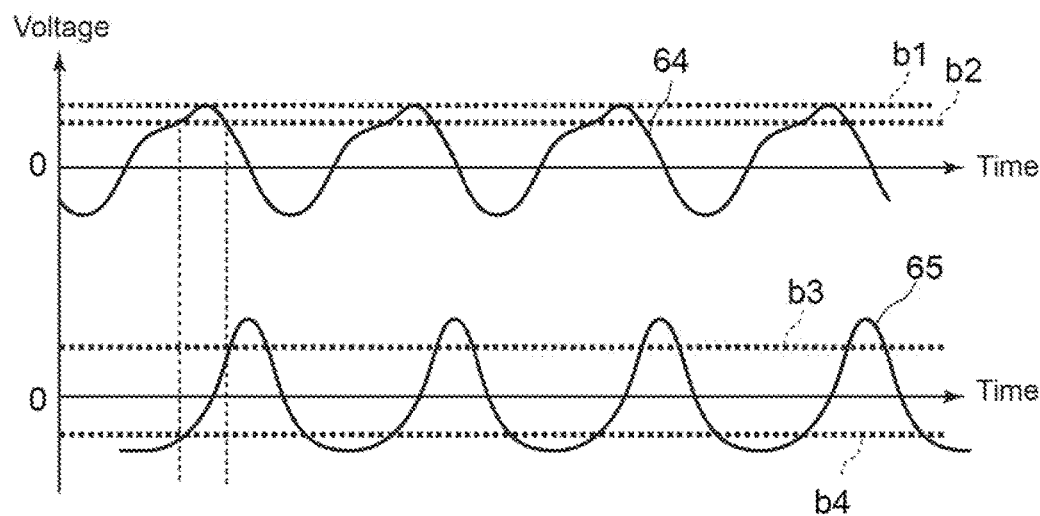
FIG. 11 is a waveform diagram for comparing an integrated signal and a signal based on the induced electromotive force of the detection device according to an embodiment.

FIG. 11 is a waveform diagram for comparing an integrated signal and a signal based on the induced electromotive force of the detection device 100 according to an embodiment. In this figure, the region between the dotted line b1 and the dotted line b2 and the region between the dotted line b3 and the dotted line b4 indicate settable ranges of the threshold.

As shown in FIG. 11, in the turbine blade 330 (330D) which is a shrouded blade, if the threshold (e.g., trigger voltage) is set for the waveform 64 of the signal based on the induced electromotive force, the threshold settable range (the region between the dotted lines b1 and b2) is narrow. However, if the threshold (e.g., trigger voltage) is set for the waveform 65 of the integrated signal, even in the turbine blade 330 (330D) which is a shrouded blade, the threshold settable range (the region between the dotted lines b3 and b4) is wide. Thus, with the detection device 100, it is possible to easily set the threshold appropriately.

(Method of Setting Threshold of Detection Device 100 According to Embodiment)

Hereinafter, the method of setting a preferable threshold in the detection device 100 for detecting the passage timing of the turbine blade 330 (330D) which is a shrouded blade will be described.

Figure 12:
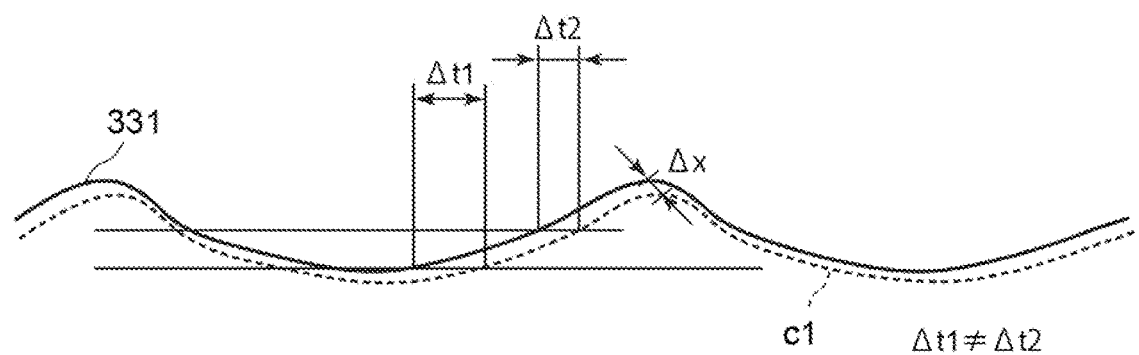
FIG. 12 is a schematic diagram showing vibration displacement of the turbine blade which is a shrouded blade.

FIG. 12 is a schematic diagram showing vibration displacement of the turbine blade 330 (330D) which is a shrouded blade. This figure shows a view of the axial end portion of the turbine blade 330 (330D) from the radially outer side. In this figure, the up-down direction indicates the axial direction, and the right-left direction indicate the circumferential, or rotational, direction.

As shown by the solid line in FIG. 12, the axial end portion of the shroud portion 331 of the turbine blade 330 (330D) is curved. The turbine blade 330 (330D) vibrates in the axial direction, for example, as shown by the dotted line c1, and may also vibrate slightly in the circumferential direction. Such vibration affects the detection timing at which the turbine blade 330 (330D) passes.

When vibration occurs, the position of the turbine blade 330 (330D) (position in the moving direction) at which the certain threshold is reached is shifted. For example, if the threshold is set such that the trigger is applied at a predetermined axial position of the turbine blade 330 (330D), time difference Δt2 occurs with respect to the case where the turbine blade 330 (330D) does not vibrate. Here, when estimating the actual amplitude Δx of the blade, for example, the ratio of the difference Δt2 of the detection time and the vibration displacement ratio Δx of the blade are used to calculate the actual amplitude Δx through numerical analysis in advance. However, if the trigger is applied at a different position than expected due to an inappropriate threshold setting, the amount of time difference actually detected may be, for example, Δt1, which is larger than Δt2. If the actual amplitude Δx of the blade is determined from the above-described ratio while the threshold is inappropriate, the determined amplitude value differs from the actual one.

This indicates that the amplitude estimation error due to the shift of the trigger position can be reduced by setting the threshold to an appropriate value. Hereinafter, the method of setting a threshold in the detection device 100 according to an embodiment will be described.

Figure 13:
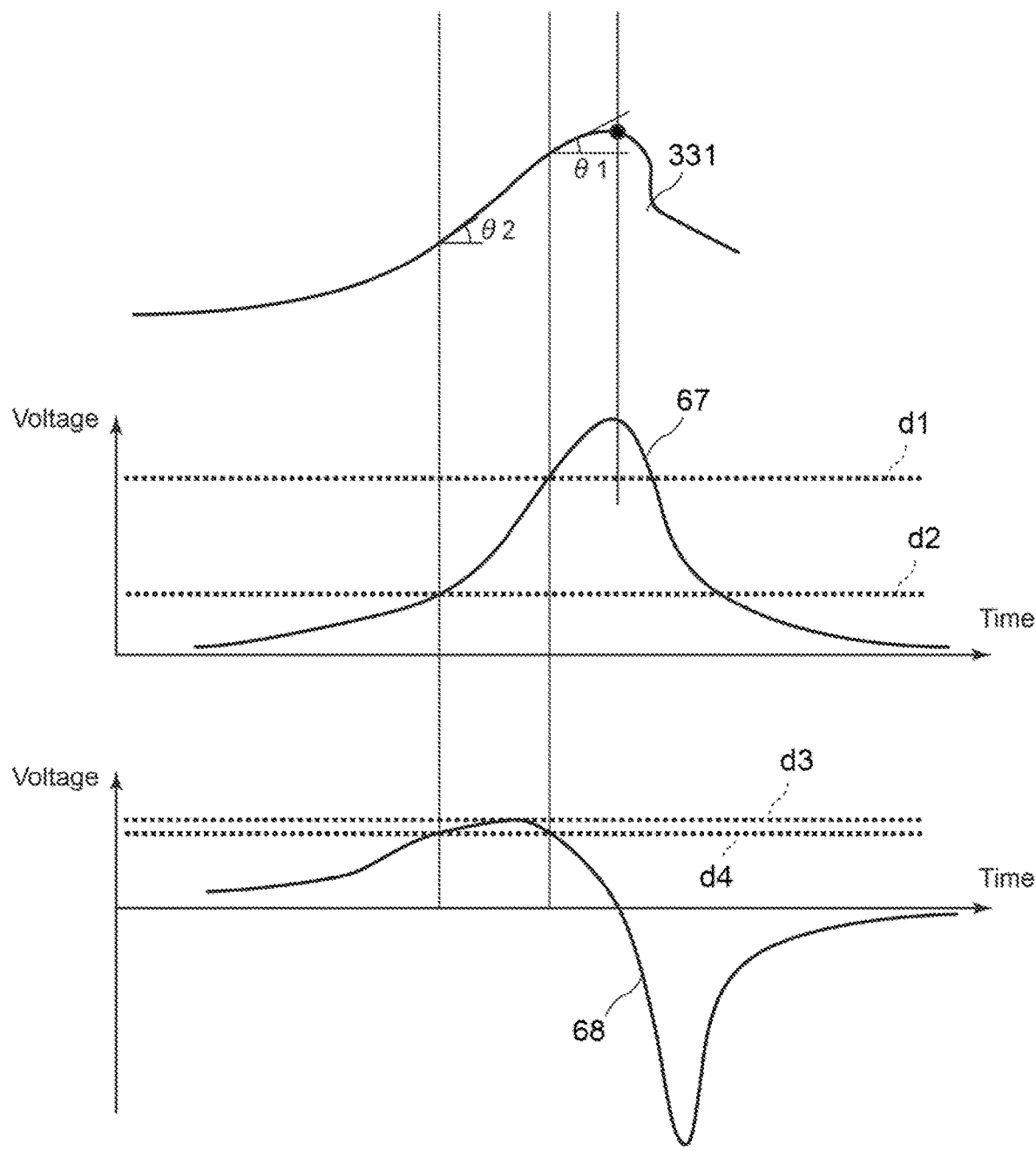
FIG. 13 is a conceptual diagram for describing a method of setting a threshold in the detection device according to an embodiment.

FIG. 13 is a conceptual diagram for describing the method of setting a threshold in the detection device 100 according to an embodiment. In this figure, the shape of the end of the shroud portion 331 is shown in the upper position, the waveform 67 indicating the integrated signal is shown in the middle position, and the waveform 68 of the signal based on the induced electromotive force is shown in the lower position. The region between the dotted line d1 and the dotted line d2 and the region between the dotted line d3 and the dotted line d4 indicate settable ranges of the threshold. θ1 and θ2 each indicate the inclination of the axial end surface of the shroud portion 331 with respect to the circumferential direction.

As shown in FIG. 13, the inclination (e.g., θ1 and θ2) of the axial end surface of the shroud portion 331 with respect to the circumferential direction varies with the circumferential position. It is preferable to set the threshold such that the trigger is applied at the position where this inclination is unlikely to change in response to the circumferential position variation. By setting the threshold in this way, it is possible to reduce the amplitude estimation error caused by the shift of the trigger position.

Specifically, first, in FIG. 13, the peak position of the output voltage of the integrator 20 (the peak position of the waveform 67) is assumed to be the top of the shroud portion 331. From the angle deviation with respect to this position, it is possible to estimate which position of the shroud portion 331 the detection region of the sensor 10 rests on.

The detection error due to the change in the inclination θ (e.g., θ1 and θ2) increases in proportion to the amount of change in tan θ when the turbine blade 330 (330D) vibrates in the circumferential direction, for example. The threshold value is adjusted so that the trigger is applied to a position where the amount of change is sufficiently small. The allowable change amount (margin of error) of tan θ is preferably, for example, about 5%, and the threshold is set in the range of (1−tan θ1/tan θ2)<±5%. As can be seen from the waveform 67 and the waveform 68, it is difficult to adjust the threshold in the waveform 68 based on the induced electromotive force since the threshold setting range is narrow, while it is easy to adjust the threshold in the waveform 67 indicating the integrated signal since the threshold setting range is wide.

In order to set such a threshold, first, while rotating the turbine blade 330 (330D), a reference waveform of the integrated signal is acquired. Then, on the reference waveform, a passage time period in a detection range where the inclination θ of the axial end surface of the shroud portion 331 of the turbine blade 330 (330D) with respect to the circumferential direction is within a predetermined range is identified, and the fluctuation range of the integrated signal on the reference waveform during the passage time period. Then, a threshold is set within the identified fluctuation range.

The predetermined range may be a range of the inclination θ determined from the margin of error (absolute reference), or a range of the predetermined θ determined by comparison with the predetermined θ at another position (relative reference). When the integrated signal is a voltage waveform, the threshold is a set value of the trigger voltage, as shown in FIG. 13. However, since the integrated signal is not limited to a voltage waveform, the threshold is not limited to a set value of the trigger voltage. For example, since the integrated signal may be an integral by arithmetic processing, the integrated signal may not be a voltage, and the threshold is not limited to the trigger voltage.

The detection range where the inclination θ is within the predetermined range is preferably a region of the shroud portion 331 of the turbine blade 330 (330D) that is located on the suction side of the blade portion of the turbine blade 330 (330D) and where the axial end surface on the leading edge side or the trailing edge side of the turbine blade 330 (330D) is inclined with respect to the circumferential direction. In this case, it is possible to further improve the accuracy of detection of the passage timing of the turbine blade 330 (330D).

According to the above method, in the detection of the passage timing of the shrouded blade, the threshold is set so that robust detection can be performed for the vibration of the shrouded blade. The setting of such a threshold may be automatically performed by the detection device 100 or may be manually performed by the user.

(Detection Method According to Embodiment)

Figure 14:
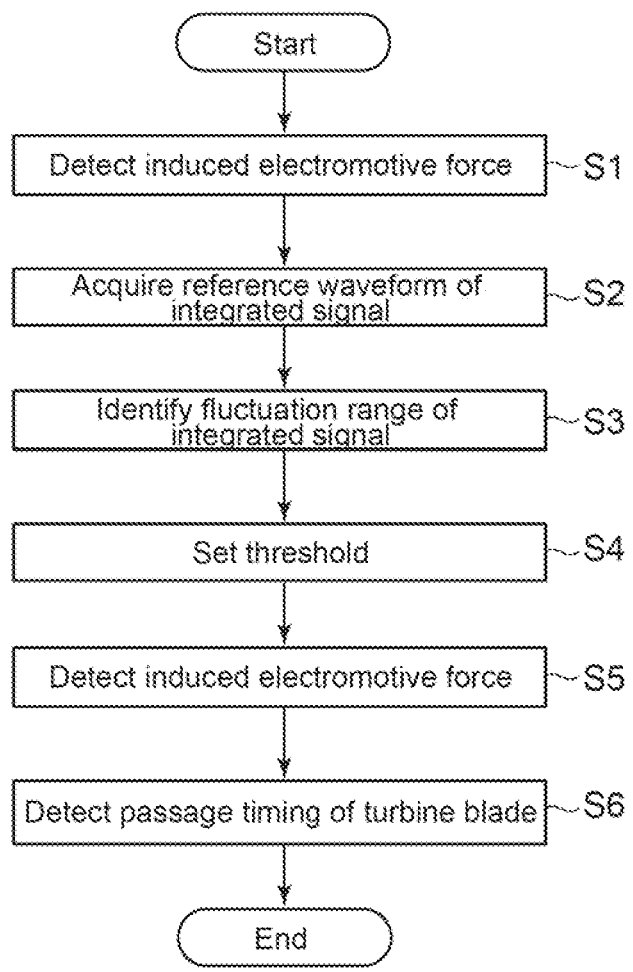
FIG. 14 is a flowchart of procedure of a detection method according to an embodiment.

The procedure of the detection method according to an embodiment will now be described. FIG. 14 is a flowchart of the procedure of the detection method according to an embodiment. Here, an example in which the turbine blade 330 (330D) is a shrouded blade and the above-described threshold is set will be described. If the threshold has already been set, or if the turbine blade 330 is not a shrouded blade, steps S1 to S4 described later may be omitted.

First, in the detection method for detecting the passage timing of the turbine blade 330 (330D), the threshold is set as a preliminary preparation. Specifically, as shown in FIG. 14, in the state where the turbine blade 330 is rotated, the sensor 10 of the detection device 100 detects an induced electromotive force based on a change in the magnetic flux accompanying the passage of the turbine blade 330 (330D) (step S1). The integrator 20 of the detection device 100 acquires a reference waveform of an integrated signal obtained by integrating a signal based on the induced electromotive force (step S2).

Then, on the reference waveform, a passage time period in a detection range where the inclination of the axial end surface of the shroud portion 331 of the turbine blade (330D) with respect to the circumferential direction is within a predetermined range is identified, and the fluctuation range of the integrated signal on the reference waveform during the passage time period is identified (step S3). A certain threshold (e.g., trigger voltage) is set within the identified fluctuation range (step S4). The setting of the threshold is completed at this stage, so the subsequent steps S5 and S6 are the procedures for detecting the passage timing of the turbine blade 330.

The sensor 10 of the detection device 100 detects an induced electromotive force based on a change in the magnetic flux accompanying the passage of the turbine blade 330 (330D) (step S5). The analyzer 50 detects the passage timing of the turbine blade 330 (330D) on the basis of an integrated signal obtained by integrating a signal based on the induced electromotive force (step S6).

According to this detection method, the passage timing of the turbine blade 330 (330D) is detected on the basis of the integrated signal in which the effect of the time derivative term of the magnetic flux is reduced. The change in the waveform of the integrated signal is small even when the rotation speed of the turbine blade 330 (330D) changes. Further, the change in the peak value of the integrated signal due to the change in the rotation speed of the turbine blade 330 (330D) is small. Thus, with this method, it is possible to improve the accuracy of detection of the passage timing of the turbine blade 330 (330D).

The present disclosure is not limited to the embodiments described above, but includes modifications to the embodiments described above, and embodiments composed of combinations of those embodiments.

CONCLUSION

The contents described in the above embodiments would be understood as follows, for instance.

(1) A detection device (100) according to an embodiment of the present disclosure is a detection device (100) for detecting a passage timing of a turbine blade (330), comprising: a sensor (10) including a magnet (11) and a coil (12) that is disposed at a position subject to magnetic flux generated by the magnet (11) and is configured to detect an induced electromotive force based on a change in the magnetic flux accompanying passage of the turbine blade (330); and an analyzer (50) configured to detect the passage timing of the turbine blade (330), on the basis of an integrated signal obtained by integrating a signal based on the induced electromotive force.

According to the above configuration (1), the passage timing of the turbine blade (330) is detected on the basis of the integrated signal in which the effect of the time derivative term of the magnetic flux is reduced. The change in the waveform of the integrated signal is small even when the rotation speed of the turbine blade (330) changes. Further, the change in the peak value of the integrated signal due to the change in the rotation speed of the turbine blade (330) is small. Thus, it is possible to improve the accuracy of detection of the passage timing of the turbine blade (330).

(2) In some embodiments, in the above configuration (1), the detection device (100) comprises an integrator (20) disposed between the coil (12) and the analyzer (50) and configured to integrate the signal based on the induced electromotive force and output the integrated signal.

According to the above configuration (2), the amount of processing of the analyzer (50) can be reduced as compared with the case where the analyzer (50) generates the integrated signal by arithmetic processing.

(3) In some embodiments, in the above configuration (2), the detection device (100) comprises a high-pass filter (30) disposed on an output side of the integrator (20) and configured to allow only a high-frequency component of the integrated signal to pass. The analyzer (50) detects the passage timing of the turbine blade (330) on the basis of the integrated signal that has passed through the high-pass filter (30).

The integrated signal is affected by long-term noise due to the accumulation of the integration constant C. If the influence of such noise is large, the detection accuracy of the passage timing of the turbine blade (330) may be reduced. In this regard, according to the above configuration (3), it is possible to reduce the influence of such noise by the high-pass filter (30) designed to have a frequency characteristic that reduces long-term noise.

(4) A rotary machine (300) according to an embodiment of the present disclosure comprises: a turbine blade; and the detection device described in any one of the above (1) to (3).

According to the above configuration (4), it is possible to accurately detect the passage timing of the turbine blade (330) of the rotating machine (300).

(5) In some embodiments, in the above configuration (4), the turbine blade (330) is a single blade having an uneven shape at a tip end.

Although the waveform of the integrated signal varies depending on the shape of the turbine blade (330), even when the turbine blade (330) is a single blade with an uneven shape at the tip end (outer peripheral surfaces), it is difficult to have multiple peak voltages passing through 0V for the passage of the single turbine blade (330). Therefore, according to the above configuration (5), it is possible to accurately detect the passage timing of the turbine blade (330).

(6) In some embodiments, in the above configuration (4), the turbine blade (330) is a shrouded blade.

If the turbine blade (330) is a shrouded blade and the threshold is set for the waveform of the signal based on the induced electromotive force, the settable range of the threshold (e.g., trigger voltage) is narrow. However, if the threshold is set for the waveform of the integrated signal, even in the turbine blade (330) which is a shrouded blade, the settable range of the threshold (e.g., trigger voltage) is wide. Therefore, according to the above configuration (6), it is possible to accurately detect the passage timing of the turbine blade (330).

(7) A detection method according to an embodiment of the present disclosure is a method for detecting a passage timing of a turbine blade (330), comprising: a step of detecting, by a sensor (10) including a magnet (11) and a coil (12) disposed at a position subject to magnetic flux generated by the magnet (11), an induced electromotive force based on a change in the magnetic flux accompanying passage of the turbine blade (330); and a step of detecting the passage timing of the turbine blade (330), on the basis of an integrated signal obtained by integrating a signal based on the induced electromotive force, by an analyzer (50).

According to the above method (7), the passage timing of the turbine blade (330) is detected on the basis of the integrated signal in which the effect of the time derivative term of the magnetic flux is reduced. The change in the waveform of the integrated signal is small even when the rotation speed of the turbine blade (330) changes. Further, the change in the peak value of the integrated signal due to the change in the rotation speed of the turbine blade (330) is small. Thus, it is possible to improve the accuracy of detection of the passage timing of the turbine blade (330).

(8) In some embodiments, in the above method (7), the detection method comprises: a step of acquiring a reference waveform of the integrated signal while rotating the turbine blade (330D); a step of identifying, on the reference waveform, a passage time period in a detection range where an inclination (θ) of an axial end surface of a shroud portion (331) of the turbine blade (330D) with respect to a circumferential direction is within a predetermined range, and identifying a fluctuation range of the integrated signal on the reference waveform during the passage time period; and a step of setting a threshold for detecting the passage timing within the fluctuation range.

According to the above method (8), in the detection of the passage timing of the shrouded blade, the threshold is set so that robust detection can be performed for vibration of a shrouded blade.

(9) In some embodiments, in the above method (8), the detection range is a region of the shroud portion (331) of the turbine blade (330D) that is located on a suction side of a blade portion of the turbine blade (330D) and where the axial end surface on a leading edge side or a trailing edge side of the turbine blade (330D) is inclined with respect to the circumferential direction.

According to the above method (9), it is possible to improve the accuracy of detection of the passage timing of the turbine blade (330D).

REFERENCE SIGNS LIST

10 Sensor
11 Magnet
12 Coil
13 Conducting wire
14 Housing
20 Integrator
30 High-pass filter
40 A/D converter
50 Analyzer
61, 62, 63, 64, 65, 66, 67, 68 Waveform
100, 200 Detection device
300, 400 Rotary machine
310 Rotational shaft
320 Rotation speed detection sensor
330 Turbine blade
331 Shroud portion

The invention claimed is:

1. A detection device for detecting a passage timing of a turbine blade, comprising:
    a sensor including a magnet and a coil that is disposed at a position subject to magnetic flux generated by the magnet and is configured to detect an induced electromotive force based on a change in the magnetic flux accompanying passage of the turbine blade; and
    an analyzer configured to detect the passage timing of the turbine blade, on the basis of an integrated signal obtained by integrating a signal based on the induced electromotive force,
    the integrated signal having a waveform with a peak value at a timing corresponding to the zero-crossing point of a vertical oscillation associated with the passage of the turbine blade in a waveform of the signal based on the induced electromotive force.

2. The detection device according to claim 1, comprising an integrator disposed between the coil and the analyzer and configured to integrate the signal based on the induced electromotive force and output the integrated signal.

3. A detection device for detecting a passage timing of a turbine blade, the detection device comprising:
    a sensor including a magnet and a coil that is disposed at a position subject to magnetic flux generated by the magnet, the sensor being configured to detect an induced electromotive force based on a change in the magnetic flux accompanying passage of the turbine blade;
    an analyzer configured to detect the passage timing of the turbine blade on the basis of an integrated signal obtained by integrating a signal based on the induced electromotive force;
    an integrator disposed between the coil and the analyzer and configured to integrate the signal based on the induced electromotive force and output the integrated signal; and
    a high-pass filter disposed on an output side of the integrator and configured to allow only a high-frequency component of the integrated signal to pass,
    wherein the analyzer detects the passage timing of the turbine blade based on the integrated signal that has passed through the high-pass filter.

4. A rotary machine, comprising:
    a turbine blade; and
    the detection device according to claim 1.

5. The rotary machine according to claim 4,
    wherein the turbine blade is a single blade having an uneven shape at a tip end.

6. The rotary machine according to claim 4,
    wherein the turbine blade is a shrouded blade.

7. A detection method for detecting a passage timing of a turbine blade, comprising:
    a step of detecting, by a sensor including a magnet and a coil disposed at a position subject to magnetic flux generated by the magnet, an induced electromotive force based on a change in the magnetic flux accompanying passage of the turbine blade; and a step of detecting the passage timing of the turbine blade, on the basis of an integrated signal obtained by integrating a signal based on the induced electromotive force, by an analyzer, the integrated signal having a waveform with a peak value at a timing corresponding to the zero-crossing point of a vertical oscillation associated with the passage of the turbine blade in a waveform of the signal based on the induced electromotive force.

8. A detection method for detecting a passage timing of a turbine blade, the detection method comprising:

a step of detecting, by a sensor including a magnet and a coil disposed at a position subject to magnetic flux generated by the magnet, an induced electromotive force based on a change in the magnetic flux accompanying passage of the turbine blade;

a step of detecting the passage timing of the turbine blade, based on an integrated signal obtained by integrating a signal based on the induced electromotive force, by an analyzer;

a step of acquiring a reference waveform of the integrated signal while rotating the turbine blade;

a step of identifying, on the reference waveform, a passage time period in a detection range where an inclination of an axial end surface of a shroud portion of the turbine blade with respect to a circumferential direction is within a predetermined range, and identifying a fluctuation range of the integrated signal on the reference waveform during the passage time period; and a step of setting a threshold for detecting the passage timing within the fluctuation range.

9. The detection method according to claim 8, wherein the detection range is a region of the shroud portion of the turbine blade that is located on a suction side of a blade portion of the turbine blade and where the axial end surface on a leading edge side or a trailing edge side of the turbine blade is inclined with respect to the circumferential direction.

\* \* \* \* \*